March 30, 1965 N. LAING 3,175,757

ROTOR CONSTRUCTION

Filed Sept. 5, 1962

NIKOLAUS LAING

By Pennie, Edmonds, Morton, Taylor & Adams
ATTORNEYS

United States Patent Office 3,175,757
Patented Mar. 30, 1965

3,175,757
ROTOR CONSTRUCTION
Nikolaus Laing, Rosenbergstr. 24A, Stuttgart, Germany
Filed Sept. 5, 1962, Ser. No. 221,626
Claims priority, application Germany, Dec. 7, 1956,
L 26,390
3 Claims. (Cl. 230—134)

This invention relates to cylindrically bladed rotors for flow machines and more particularly to rotor sections that may be made of a moldable material and combined together to form a rotor. This application is a continuation-in-part of application Serial No. 671,114, filed July 5, 1957, now abandoned.

Cylindrically bladed rotors are used in flow machines where fluid is made to flow in an axial direction into or out of a rotor and radially through the path of the rotating blade, and such machines are known generally as centrifugal type flow machines. The rotors of such machines must be opened at one end and must be of a limited length.

Cylindrical bladed rotors are also used in cross-flow type machines where fluid is caused to flow through the path of rotating blades to the interior of the rotor and thence out of the rotor through the path of the rotating blades in a direction perpendicular to the rotor axis. Flow machines of this type are illustrated in the copending application Serial No. 671,114. Rotors for cross-flow type machines may be of any desired length, and while it is desired that the rotor ends be closed if they are of short length, they may be left open if they are of a long length. When the rotors are closed at their ends, the end closure means may take the form of a stationary part connected to the housing surrounding the rotor or may take the form of end plates contained in the rotor itself and which rotate with the rotor.

An advantage of cross-flow machines of the type disclosed in the copending application is that they may be made economically without adhering to close manufacturing tolerances. In order to further reduce the expense of manufacture, it is desirable that the rotors be made with a minimum of standardized parts so as to facilitate assembly. An object of the invention is, therefore, to produce a rotor construction which may be made with a series of individually moldable parts which in turn may be secured together axially to form a rotor of desired length.

The invention accordingly provides generally for a rotor section comprising a support in the form of an annulus or disc wherein a ring of blades is carried by the support and extends at right angles to the general plane of the support with the section being adapted to fit together in axial alignment with one or more similar rotor sections to form a single structure comprising a rotor. Preferably the rotor section has one of its axial ends complementary in shape to its other axial end whereby one section may be fitted together with another identical section at either end and in axial alignment therewith. Rotors for flow machines of different capacity may be made by fitting together a suitable number of identical rotor sections to achieve a rotor of desired length. Shaft extensions or shaft receiving means may be provided to the rotor sections if desired. The rotor sections themselves are so shaped that they can be produced by injection molding techniques utilizing a plastic material and they are further so designed that the sections may be snapped together quickly without requiring additional securing means.

A rotor constructed according to the invention has a further advantage in that rotors of long width may be constructed utilizing injection molding techniques to form individual sections as set out above, whereas the molding of a long rotor in a single piece might be objectionable because of the difficulty in molding the blades and also in the failure to provide a support for the individual blades to keep them aligned.

Various embodiments of the invention are illustrated by way of example in the accompanying diagrammatic drawings in which.

Figure 1:
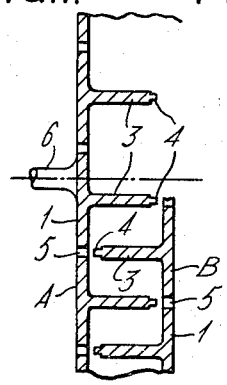
FIG. 1 is a broken side sectional view of two unassembled rotor sections.
Figure 2:
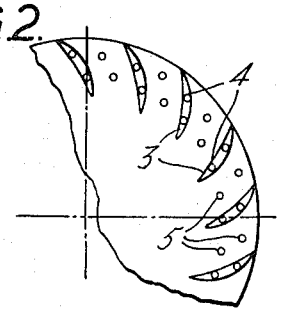
FIG. 2 is a partial side view of one of the sections illustrated in FIG. 1 looking in the axial direction.

Referring to the drawings, FIG. 1 shows a cylindrical bladed rotor just before assembly of its constituent sections designated A and B. Each section comprises a support disc or ring 1 from which project perpendicularly a ring of blades 3. The spacing of the blades 3 of each section is double the blade spacing on the rotor as a whole, and in the assembled rotor, the blades of the two sections alternate. Each blade 3 carries a pair of pegs or projections 4 upon its end remote from the support disc 1 and these projections engage on assembly of the sections in mating holes 5 formed in the support disc 1 of the other section. A spindle 6 extends from the section A.

It is seen that apart from the spindle 6, the sections A and B are mirror images of one another. Both sections can conveniently be made by injection moulding from a plastics material.

Figure 3:
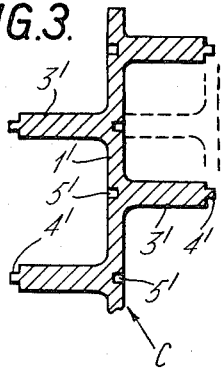
FIG. 3 is a partial sectional view of a different embodiment of rotor section from that shown in FIG. 1.

FIG. 3 illustrates a rotor section C having blades 3' similar in shape and spacing to the blades 3 of one of the FIG. 1 sections A or B and which project from either side of a support disc or ring 1'. The blades 3' on one side are staggered with respect to the blades on the other side. Each blade 3' carries upon its end remote from the disc 1' a pair of projections 4', while corresponding holes 3' are formed in the disc or ring 1' opposite the root of each blade. Thus the left hand and right hand ends of the section C are complementary and any number of identical sections C can be fitted together in axial alignment by pushing the projections of one section into the holes of the next. The ends of the rotor are formed by sections A and B mated with the sections C in the same way as the FIG. 1 sections A and B are mated with each other. To make a rotor having an axial length equal to N times the axial length of either of sections A or B, N−1 sections C are mated together and to the assembly thus produced, a section A is mated at the left hand and a section B at the right hand end.

The rotor section C can also be conveniently moulded of a plastic material.

Figure 4:
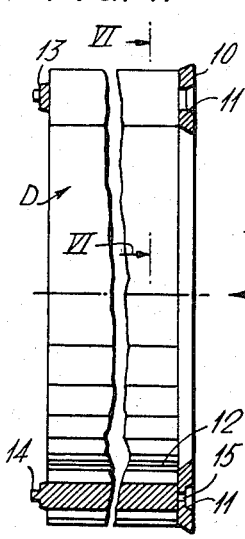
FIG. 4 is a broken partial side sectional view of interfitting modified rotor sections taken along the lines IV—IV of FIG. 5.
Figure 5:
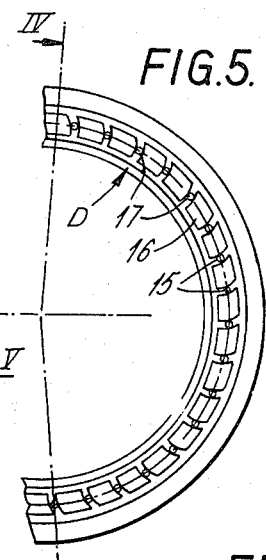
FIG. 5 is a partial axial view of a rotor section of FIG. 4.
Figure 6:
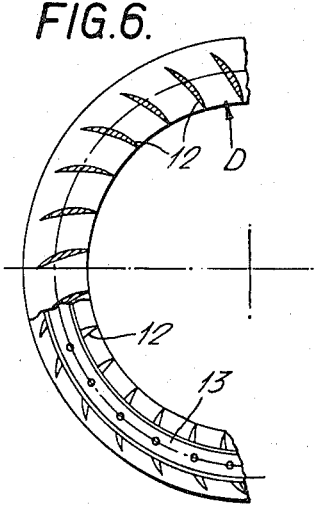
FIG. 6 is a partial axial sectional view of a rotor section of FIG. 4 taken along the lines VI—VI.

The rotor section D of FIGS. 4, 5 and 6 comprises a support ring 10 with an annular recess 11 in one side. A series of blades 12 projects from the other side of the ring 10 and the ends of the blades remote from the ring 10 are interconnected by a second ring 13 of a width and depth to fit exactly in the groove 11. The ring 13 carries a projection 14 in alignment with each blade 12, and corresponding holes 15 are formed in the support ring 10, the holes leading out of recess 11. Thus one end of the rotor section D is complementary to the other end, and a plurality of such sections can be push-fitted together in axial alignment. A complete rotor will require at least one end section to which a drive spindle is or can be attached.

The rotor section D of FIGS. 4 to 6 is designed to be moulded of a plastic material in one piece by the use of a pair of axially movable dies. For this reason the support ring 10 has apertures 16 the edges 17 of which in the generally radial direction are aligned with the central parts of the blade surfaces and the radial width of the apertures 16 is equal to that of the ring 13 where it joins the blades 12. One die has fingers which after molding extend through, and are withdrawn through, the apertures 16 and these fingers on moulding mate with parts of the other dies which extend past the ring 13 on either side thereof to form moulds for the blades, the fingers defining the central parts of the blades and said parts of the other die the edge portions of the blades.

Figure 7:
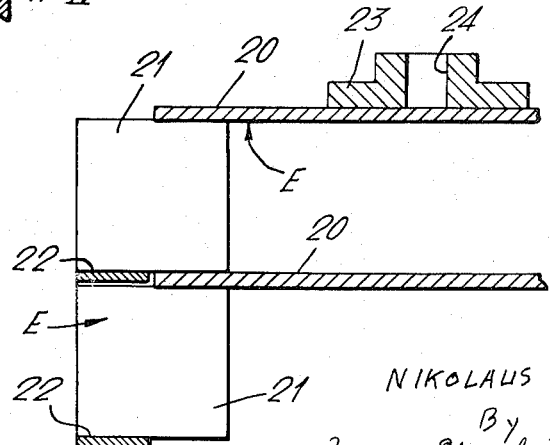
FIG. 7 is an enlarged partial section view illustrating a further embodiment of rotor section.

Each rotor section E of FIG. 7 comprises a support disc 20 and blades 21 extending at right angles to the plane of the disc. The ends of the blades 21 remote from the disc 20 are joined by a flat ring 22. The inner diameter of the ring 22 exceeds slightly the outer diameter of the disc 20 so that the ends of the rotor section are complementary and any number of sections can be push-fitted together in the manner indicated in the figure. At least one end section will be required to complete the rotor; however, the end section shown at 23 is simply a boss secured to the disc 20 and adapted to receive in its axial bore 24 a drive spindle. A simple disc having the same dimensions as the support disc 20 can be secured to the opposite end of the rotor. However if the rotor is to be run in close proximity to a stationary wall it is unnecessary to provide it with a rotating closure.

The rotor sections of FIG. 7 can easily be moulded from a plastics material. It will be easier to mould several such sections and assemble them together than to mould a long rotor from plastics material in one piece. In a long rotor moulded in one piece it would be difficult to support the blades intermediate their ends while in a rotor made up as prescribed by the invention, each section provides a support for the blades.

As will be appreciated, the invention is chiefly concerned with rotors in which flow takes place always transverse to the rotor axis. A rotor such as shown in FIG. 7 with its intermediate transverse portions would only be suitable for such flow. However certain rotors according to the invention may be used in flow machines of the centrifugal type mentioned above.

I claim:
1. A rotor comprising a plurality of similar rotor sections assembled axially end to end and extending in the same direction wherein each said rotor section comprises a circular support, a plurality of blades integral with said support and extending at right angles thereto, and interfitting means for joining adjacent sections together.

2. A rotor comprising a plurality of similar rotor sections assembled axially end to end and extending in the same direction wherein each said rotor section comprises a circular support, a plurality of blades integral with said support and extending at right angles thereto, an annular supporting ring integral with the end of the blades opposite said support having an inside diameter substantially equal to the outside diameter of said support wherein said circular support of one rotor section may be inserted into the annular supporting ring of an adjacent rotor section to join the sections together.

3. A rotor comprising a plurality of similar rotor sections assembled axially end to end and extending in the same direction wherein each said rotor section comprises a circular support, a plurality of blades integral with said support and extending at right angles thereto, a projection on the end of each said blade opposite said support, and a recess in each said support positioned between adjacent blades wherein the projections of the blades of one rotor section may be inserted into the recesses of an adjacent rotor section to join the sections together.

References Cited in the file of this patent
UNITED STATES PATENTS

| | | |
|---|---|---|
| 638,277 | Rigdon | Dec. 5, 1899 |
| 1,143,365 | Davidson | June 15, 1915 |
| 1,919,970 | Woods | July 25, 1933 |
| 1,950,768 | Anderson | Mar. 13, 1934 |
| 2,209,028 | Kortz | July 23, 1940 |
| 2,362,868 | Upson | Nov. 14, 1944 |
| 2,549,208 | Kice | Apr. 17, 1951 |
| 2,958,459 | Newton et al. | Nov. 1, 1960 |

FOREIGN PATENTS

| | | |
|---|---|---|
| 495,846 | Italy | Jan. 25, 1954 |